(12) United States Patent
Consolatti et al.

(10) Patent No.: US 7,269,792 B2
(45) Date of Patent: Sep. 11, 2007

(54) SYSTEM AND METHOD FOR GENERATING HIGH-FUNCTION BROWSER WIDGETS WITH FULL ADDRESSABILITY

(75) Inventors: Scott M. Consolatti, Raleigh, NC (US); Charles R. Jaynes, Apex, NC (US); Tracy L. Rankin, Durham, NC (US); Lawrence C. Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 10/422,932

(22) Filed: Apr. 24, 2003

(65) Prior Publication Data

US 2004/0216042 A1    Oct. 28, 2004

(51) Int. Cl.
*G06F 15/00* (2006.01)
*G06F 13/00* (2006.01)

(52) U.S. Cl. ........................... 715/749; 715/744

(58) Field of Classification Search ................ 715/853, 715/854, 513, 501.1, 738, 749, 734, 735, 715/744
See application file for complete search history.

(56) References Cited

U.S. PATENT DOCUMENTS

| | | |
|---|---|---|
| 6,003,047 A | 12/1999 | Osmond et al. |
| 6,446,096 B1 | 9/2002 | Holland et al. |
| 6,961,929 B1* | 11/2005 | Pelegri-Llopart et al. ... 717/136 |
| 2001/0034771 A1 | 10/2001 | Hutsch et al. |
| 2002/0075309 A1 | 6/2002 | Michelman et al. |
| 2002/0080200 A1 | 6/2002 | Wong et al. |
| 2002/0101448 A1 | 8/2002 | Sanderson |
| 2002/0120859 A1 | 8/2002 | Lipkin et al. |
| 2002/0123957 A1 | 9/2002 | Notarius et al. |
| 2002/0156806 A1 | 10/2002 | Cox et al. |
| 2004/0148565 A1* | 7/2004 | Davis et al. .............. 715/501.1 |

* cited by examiner

*Primary Examiner*—Cao (Kevin) Nguyen
(74) *Attorney, Agent, or Firm*—Duke W. Yee; Martin J. McKinley; Gerald H. Glanzman

(57) ABSTRACT

A system and method for generating high-function browser widgets with full addressability are provided. With the system and method, custom JSP tags are utilized that generate JavaScript objects to provide the high-function browser widgets. The JavaScript objects, in turn, output HTML for use by a client side Web browser. These JavaScript objects have instance-level functions or actions that are encapsulated in the widget as well as a complete client-side model representation of the data also encapsulated in the widget object. These objects and actions are fully addressable by the developer via a getWidgetByID method on a global utility object. As a result, higher-level features and full inter-widget communication are achievable using the custom JSP tags of the present invention.

18 Claims, 6 Drawing Sheets

SYSTEM AND METHOD FOR GENERATING HIGH-FUNCTION BROWSER WIDGETS WITH FULL ADDRESSABILITY

FIELD OF THE INVENTION

The present invention is directed to a system and method for generating high-function browser widgets with full addressability. More specifically, the present invention is directed to a system and method for using custom Java Server Page (JSP) tags to output JavaScript Objects for high-function browser widgets with full addressability.

BACKGROUND OF THE INVENTION

Web browsers are programs that serve as a front end to the World Wide Web on the Internet. In order to view a Web site, its address, i.e. Uniform Resource Locator (URL), is typed into the Web browser's location field and the home page of that Web site is downloaded to the Web browser. The home page is an index to other Web pages on that site that can be accessed by clicking a message or an icon on the home page. The home page is either received in a HyperText Markup Language (HTML) format or is converted to an HTML format by the Web browser for displaying to the user.

Some Web pages on the Internet make use of JavaServer Pages (JSP). JSP is an extension to the Java servlet technology that provides a simple programming vehicle for displaying dynamic content on a Web page. The JSP is an HTML Web page with embedded Java source code that is executed in the Web server or application server. The HTML provides the page layout that will be returned to the Web browser, and the Java provides the processing. For example, a JSP Web page may be used in which the HTML identifies the format of the Web page and the Java source code delivers a query to a database and fills in blank fields of the Web page with the results.

In order to create a Web page using JSP, the programmer simply writes the regular HTML in the normal manner, using whatever Web-page-building tools they normally use. The programmer then encloses the code for the dynamic parts in special tags, most of which start with "<%" and end with "%>". For example, here is a section of a JSP page that results in something like
"Thanks for ordering Steve's Guide to JSP" for a URL of http://host/OrderConfirmation.jsp?title=Steve's+Guide+to+JSP:
Thanks for ordering
<I><%= request.getParameter ("title") %></I>

Normally, the programmer gives the resulting file a ".jsp" extension, and typically installs it in any place a normal Web page may be installed. Although what is written typically looks more like a regular HTML file than a servlet, behind the scenes, the JSP page is converted to a servlet, with the static HTML simply being printed to the output stream associated with the servlet's service method. This is normally done the first time the page is requested.

Aside from the regular HTML, there are three main types of JSP constructs that may be embedded in a Web page: scripting elements, directives, and actions. Scripting elements let you specify Java code that will become part of the resultant servlet. Directives let you control the overall structure of the servlet. Actions let you specify existing components that should be used and otherwise control the behavior of the JSP engine. To simplify the scripting elements, programmers have access to a number of predefined variables such as "request" in the example above.

The standard JSP tags simplify JSP page development and maintenance. However, in order to obtain additional functionality, JSP technology also provides a mechanism for encapsulating other types of dynamic functionality in custom tags, which are extensions to the JSP language. Custom tags are usually distributed in the form of a tag library, which defines a set of related custom tags and contains the objects that implement the tags. Some examples of tasks that can be performed by custom tags include operations on implicit objects, processing forms, accessing databases and other enterprise services such as electronic mail and directories, and performing flow control. JSP tag libraries are created by developers who are proficient at the Java programming language and expert in accessing data and other services, and are used by Web application designers who can focus on presentation issues rather than being concerned with how to access enterprise services. As well as encouraging division of labor between library developers and library users, custom tags increase productivity by encapsulating recurring tasks so that they can be reused across more than one application.

With JSP Web pages, the Java Source code embedded therein is compiled into bytecode, e.g., into a servlet, when first encountered by the server. A servlet is a Web server that builds Web pages based on data that may be dynamic in nature. When a JSP page containing a custom tag is translated into a servlet, the tag is converted to operations on an object called a tag handler. The Web container, i.e. runtime environment, then invokes those operations when the JSP page's servlet is executed. The result is an HTML stream to the Web browser that contains the original HTML of the JSP Web page and the HTML generated by the servlet.

Thus, custom JSP tags, when compiled and executed by the server, generate raw HTML tags. With some Web pages, the customer JSP tags may be utilized to generate limited global JavaScript functions which along with the HTML provide a low-function view of "widgets" on the web page. A "widget" is a general term for a graphical user interface element, e.g., drop-down menu, dialog window, virtual push button, and other elements of a graphical user interface. Since custom JSP tags output raw HTML with only minimal global JavaScript functions, the developer of the Web page must resort to writing his/her own JavaScript to perform higher-level features and to achieve any inter-widget communication. Here, low-level features include, for example, simple rollover techniques and button click processing, whereas high-level features include those features that actually manipulate the data after the Web page is rendered, such as sorting table columns, updating the data presented in the view, and allowing for the connection of any widget event to any other widget action in any combination that meets the needs of the developer. Thus, it is not possible with known mechanisms to generate high-level functionality widgets in a JSP Web page based on the custom JSP tags contained within the JSP Web page. Known mechanisms provide the view only, which in actual practical usage tops out quickly and requires additional custom coding.

Therefore, it would be beneficial to have a system and method for generating high-function browser widgets with not only a view but also complete model and handler objects that allow for full addressability. Moreover, it would be beneficial to have a system and method by which custom JSP tags may be used to generate high-function widgets without requiring explicit JavaScript programming of those widgets in the code of the JSP Web page.

SUMMARY OF THE INVENTION

The present invention provides a system and method for generating high-function browser widgets with full addressability. With the system and method of the present invention, custom JSP tags are utilized that generate JavaScript objects to provide the high-function browser widgets. These JavaScript objects have instance-level functions or actions that are encapsulated in the widget as well as a complete client-side model representation of the data also encapsulated in the widget object. These objects and actions are fully addressable by the developer via a getWidgetByID method on a global utility object. The global utility object is included and declared as the JavaScript jswUtil variable on any page that uses one of the widgets, thus the syntax jswUtil.getWidgetByID can be used at any time to reference the view and model objects. As a result, higher-level features and full inter-widget communication are achievable using the custom JSP tags of the present invention.

Complete client-side JavaScript objects in the client-side model allow for complete model-view-handler separation. Handler tags/objects can be introduced for easily connecting common events of one widget to common actions of another widget. Using JSP tags to generate JavaScript objects allows user interface look-and-feel to be modified without changing the server-side JSP code. Developer productivity is improved because complex and dynamic user interfaces can be generated using a few simple JSP tags. Debugging client-side code is enhanced because the data used to generate the displayed HTML is available on the client. Moreover, source code is better protected since the code is encapsulated in JavaScript objects which introduces a second layer of processing by the browser and the "view source" functionality of the Web browser cannot be used to access the traditional first layer of HTML tags that represent the view.

These and other features and advantages of the present invention will be described in, or will become apparent to those of ordinary skill in the art in view of, the following description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
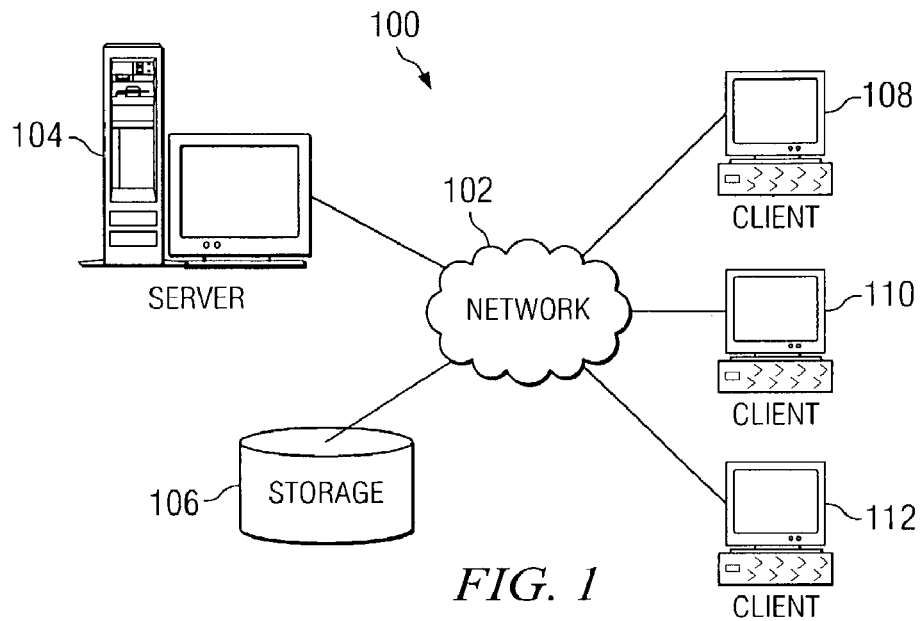
FIG. 1 is an exemplary block diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
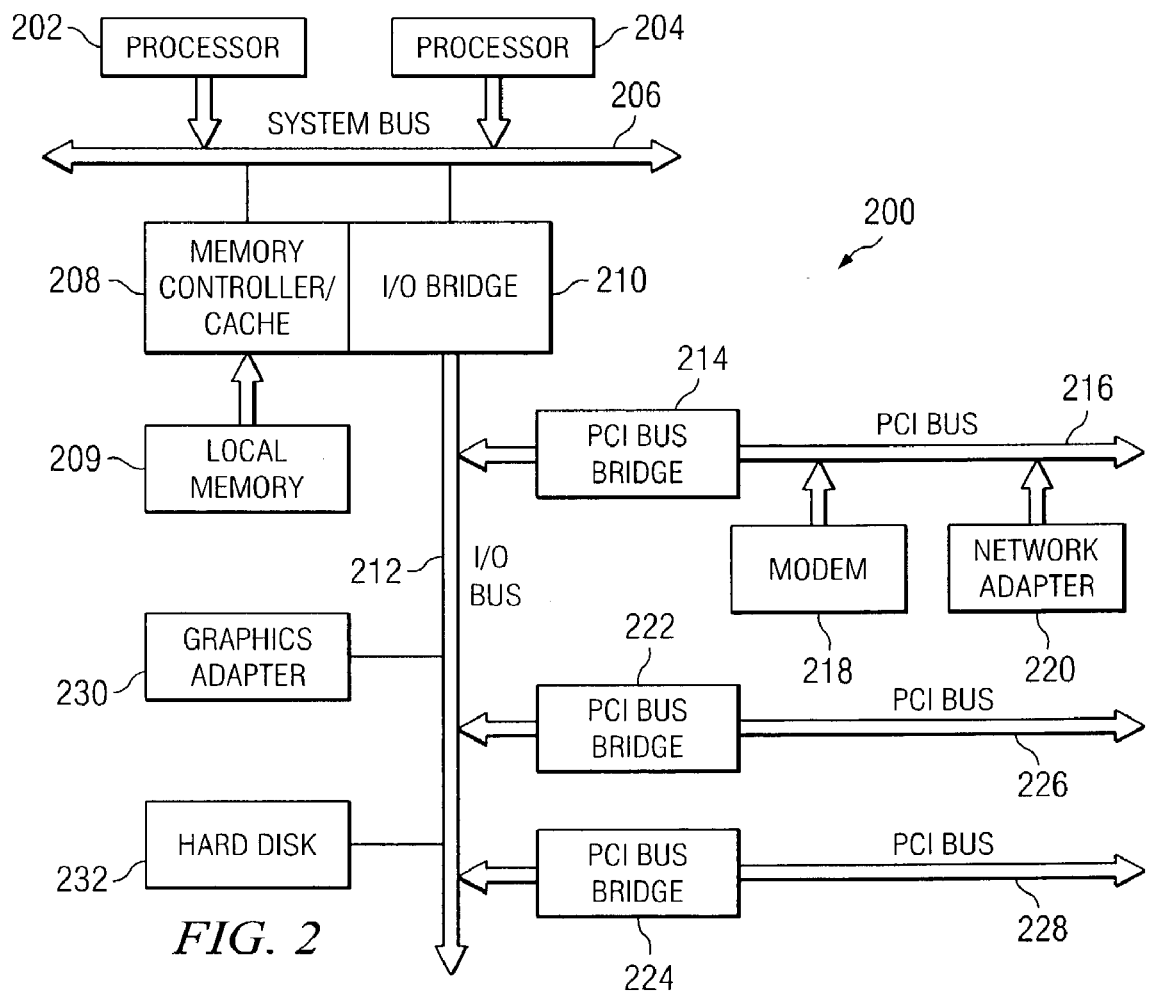
FIG. 2 is an exemplary block diagram of a server computing device according to an exemplary embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
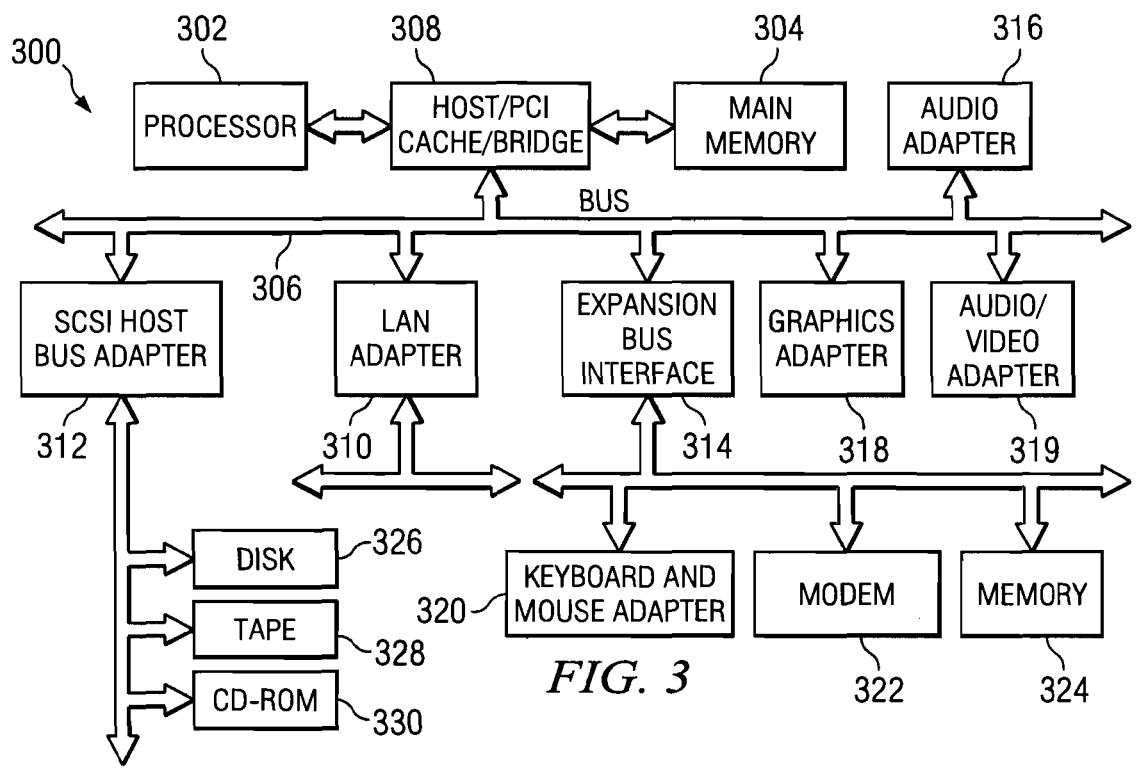
FIG. 3 is an exemplary block diagram of a client computing device in accordance with an exemplary embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned, the present invention provides a system and method for generating high-function browser widgets with full addressability. With the system and method of the present invention, custom JSP tags are utilized that generate JavaScript objects to provide the high-function browser widgets. These JavaScript objects, in turn, output HTML for use by a client side Web browser.

With the system and method of the present invention, a new widget architecture is provided for handling custom JSP tags such that JavaScript objects are generated and utilized to provide high-function level browser widgets. In this new architecture, a client side model-view-handler separation is obtained. That is, for a JSP defined widget, such as in a JSP Web page, the present invention provides a client side model consisting of one or more objects associated with the widget, a view of the widget as defined by the HTML code in the JSP Web page and the HTML code generated by the one or more objects of the client-side model, and one or more handler objects for connecting events generated via the view of the widget to actions performed using the methods in the client side model object.

The client-side model is generated based on a server-side model that may contain a plurality of objects, JavaBeans, and the like, that may be referenced by JSP tags in a JSP Web page. The subset of objects from this server-side model that are used with a specific JSP Web page widget are used to generate the client-side model objects. The server may further include its own handlers for handling events generated by the client-side view of the JSP Web page widgets that requires the server to operate on the events to perform actions.

Figure 4A:
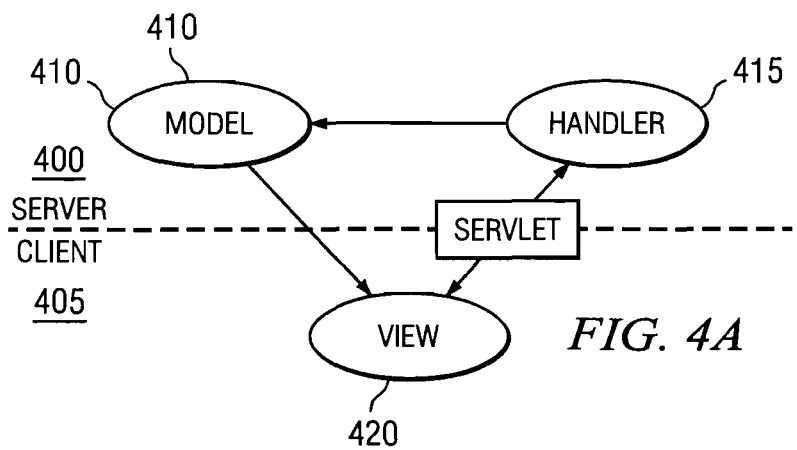
FIG. 4A is a diagram of a known server-client architecture in which JSP tags in a JSP Web page may be utilized.

FIG. 4A is a diagram of a known server-client widget architecture in which custom JSP tags in a JSP Web page may be utilized. In the example shown in FIG. 4A it is assumed that the Web page downloaded from the server 400 is a JSP Web page in which data is received from a user of a client device 405 via fields of the JSP Web page. This data is then used with the Java code to generate additional HTML which is downloaded to the client 405 and used to update the view on the client 405.

As shown in FIG. 4A, the architecture involves a server-side model 410, a server-side handler 415, and a client-side view 420. As is generally known in the art, custom JSP tags in a JSP Web page may be sent to the client 405 as a combination of HTML code with JavaScript code contained therein. The JSP Web page may then be rendered on the client 405 by the Web browser using the HTML of the JSP Web page. Input is received via the client-side view 420 and sent to the server 400 via a servlet.

At the server, the servlet passes the data to the server-side tag handler 415. The server-side tag handler 415 may invoke objects from the server-side model 410 to thereby perform operations and generate HTML formatted results that are sent to the client 405. These HTML formatted results are then used to update the view 415 on the client 405.

If the JSP Web page contains a widget, i.e. a graphical user interface element such as a drop down menu, virtual button, etc., any high-level functionality must be explicitly specified by the developer in JavaScript included in the JSP Web page. As a result, the only manner by which these high-level functions are achievable is through the use of a servlet at the server 400 which will take user input, apply it to a tag handler 415, and thereby generate static HTML output that is used to update the view 420 at the client 405. There is no ability in the known systems to provide high-level functionality of widgets within the client-side environment using JSP Web pages.

Figure 4B:
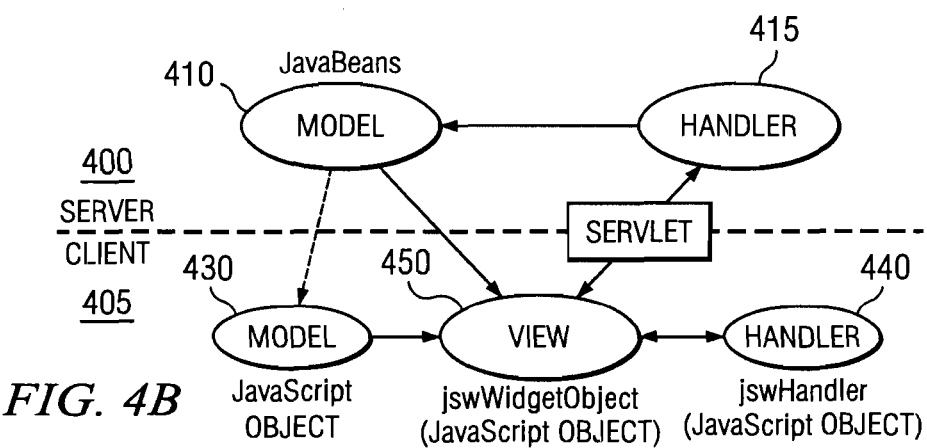
FIG. 4B is an exemplary diagram of an architecture according to the present invention.

FIG. 4B is an exemplary diagram of a widget architecture according to the present invention. As shown in FIG. 4B, the architecture includes a server-side 400 and a client-side 405. The server-side 400 includes a server-side model 410 and a server-side handler 415. These elements are similar to the elements shown in FIG. 4A.

The client-side 405 includes a client-side model 430, client-side handlers 440 and a client-side view 450. The client side model 430 and handlers 440 are generated by the custom JSP tags of the present invention in the JSP Web page downloaded to the client 405, as discussed hereafter. The client-side view 450 is generated by the custom JSP tags of the present invention in the form of JavaScript objects that generate the HTML representation of the view.

With the present invention, when the server 400 provides a JSP Web page with custom JSP tags defining a browser widget to the client 405, the server 400 generates objects for the browser widget and HTML code for representing the Web page and the browser widget. In this way, the server 400 generates a combination of JavaScript objects and HTML to represent the JSP Web page. The JavaScript objects are generated for browser widgets reference by the JSP Web page and together are sent to the client 405 to thereby generate the client-side model 430. The JSP Web page response sent to the client 405 further includes JavaScript representations of the handlers 440 associated with the JavaScript objects in the client-side model 430. The JSP Web page response sent to the client device 405 further includes JavaScript representations of the view 450 of the browser widgets contained in the Web page. These JavaScript objects and the HTML generated by them comprise the client-side view 450.

Because JavaScript objects are being output by the server 400 to the client device 405 as part of the JSP Web page, high-level functionality with regard to browser objects is achievable without requiring the developer to encode the JSP Web page with detailed JavaScript identifying the functionality of the browser widget and without needing to make a request to the server. Rather, the developer need only reference the client-side view 450, model 430 and handlers 440 in a way (widget addressability as defined previously) that is direct and contained to the client. The present invention automatically generates the widget JavaScript objects from the widget tag object based on the JavaBeans and handlers referenced in the custom JSP Web page tags, as described hereafter.

Figure 5:
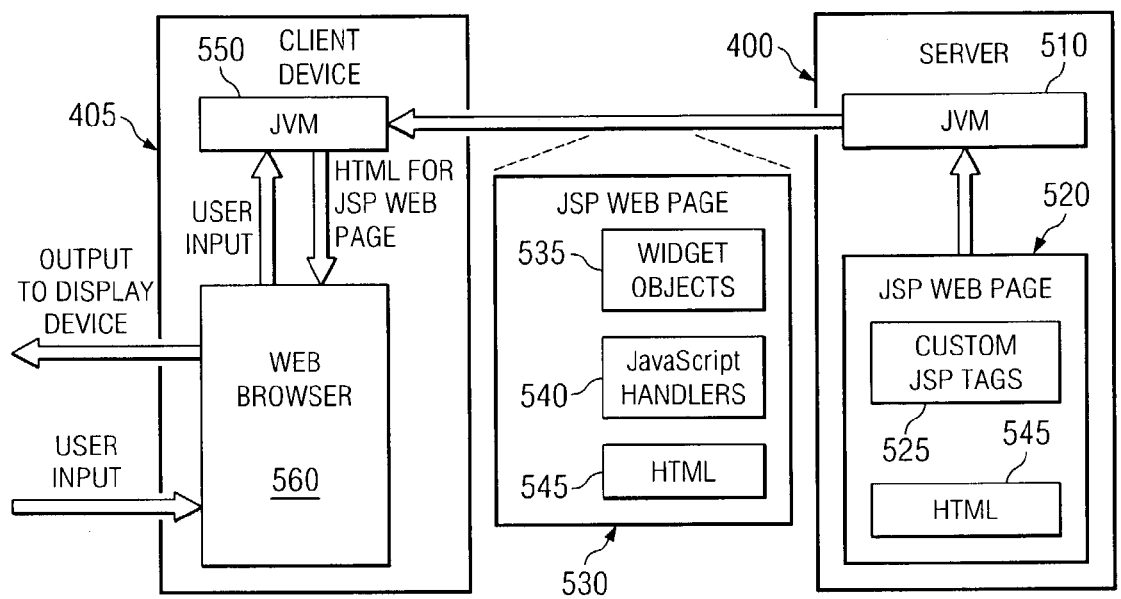
FIG. 5 is an exemplary diagram of the primary operational components of an exemplary embodiment of the present invention.

FIG. 5 is an exemplary diagram of the primary operational components of an exemplary embodiment of the present invention. As shown in FIG. 5, the server 400 includes a Java Virtual Machine (JVM) 510 that takes the JSP Web page 520 requested by the client 405 and reads the custom JSP tags 525 of the JSP Web page to determine if a browser widget is identified in the JSP Web page 520. A widget is identified by a tag that begins with the prefix specified when registering the tag library definition (.tld) file at the top of the JSP Web page.

If a browser widget is identified, the JVM 510 constructs a tag object from a tag class that is a subclass of the Java Enterprise Edition Specification javax.servlet.jsp.tagext.TagSupport class and registered to the widget in the TLD file. The tag object generates the JavaScript object(s) for the widget and outputs the JavaScript object to the HTML response stream for the JSP Web page.

In generating the object, the tag object in the JVM 510 generates a JavaScript script block that links the appropriate JavaScript (.js) file containing the JavaScript class definition for the widget and a JavaScript script block that constructs the widget JavaScript object using the class definition and sets the variable name of the construction in the widget object. The tag object in the JVM 510 also determines whether there are any JavaBeans from the server-side model 410 referenced in the attributes of the custom JSP tag and passed to the tag object by the JVM 510. If there are JavaBeans referenced by the widget tags, these JavaBeans are converted to a JavaScript representation of the JavaBean which is encapsulated in the widget object.

Additionally, the JVM 510 determines if there are any widget handlers identified in the JSP Web page 520. If so, the JVM 510 constructs a handler tag object which outputs a JavaScript script block that links the handler JavaScript (.js) file containing the JavaScript class definition for handlers and a JavaScript script block that constructs the handler JavaScript object using the class definition and registers the handler(s) in the widget object.

The event type is then set into the widget object. The event type identifies what events cause a handler to be invoked to generate an action by the widget object. An HTML tag representation of the widget view is then output either directly through the tag object in the JVM 510 or through the widget JavaScript object when the JVM at the client invokes the object when rendering the web page using the browser.

The result of the above operations is a JSP Web page 530 that includes widget objects 535, JavaScript handlers 540, and HTML 545 representing the view of the JSP Web page 530 and widget objects 535. This JSP Web page 530 is received by a JVM 550 in the client device 560 which uses the HTML 545 to generate a view of the JSP Web page 530 in a client-side Web browser 560. In response to user input, the web browser 560 uses the JVM 550 to invoke the widget objects 535 for the JSP Web page to provide the widget high-level functionality, and uses the JavaScript handlers 540 to handle events that occur based on user input.

Thus, through the use of the present invention, a JSP Web page is provided to the client device as a combination of widget objects, JavaScript handlers and HTML view representation code. The widget objects are automatically generated based on the custom JSP tags in the JSP web page. Thus, the developer of a JSP Web page need not include complex JavaScript code for implementing high-level functionality for widgets and may simply refer to JavaBeans in a server-side model using custom JSP tags. The present invention takes those custom JSP tags and generates a widget object that encapsulates the high-level functionality for use by the client device in rendering the JSP Web page.

FIGS. 6-8B are flowcharts that illustrate various levels of operation according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 6:
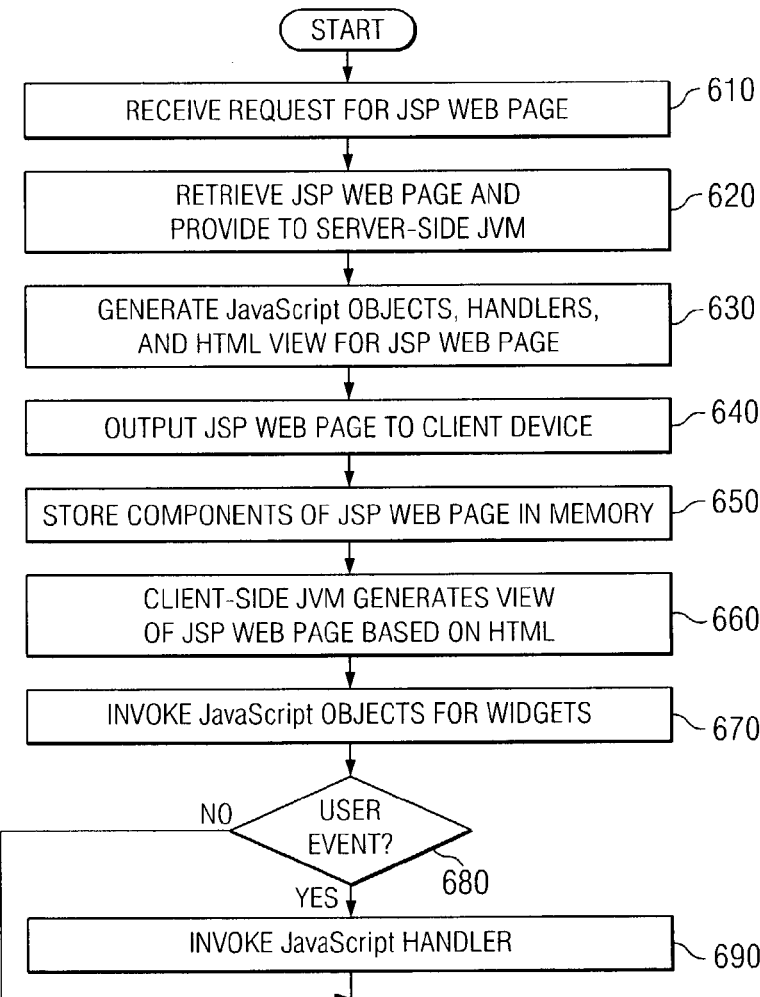
FIG. 6 is a flowchart outlining an operation of the present invention when generating an HTML stream based on a JSP Web page in which custom JSP tags according to the present invention are utilized.

FIG. 6 is a flowchart outlining an overall operation of a server-client system in accordance with the present invention. As shown in FIG. 6, the operation starts with a request being received from a client device for a JSP Web page (step 610). The JSP Web page is retrieved and provided to the server-side JVM (step 620). The JVM converts custom tags into tag objects which in turn generate JavaScript objects for any browser widgets referenced in the JSP Web page, JavaScript representations of any handlers associated with the JavaScript objects, and HTML code for the view of the JSP Web page and JavaScript objects (step 630). Together these elements constitute a JSP Web page to be output to the client device. The JSP Web page response is then output to the client device (step 640) which receives the response and stores the components of the response in memory (step 650). The client-side JVM then operates on the HTML and invokes the JavaScript objects (step 660) for providing the browser widgets to generate a view of the JSP Web page (step 670). A determination is made as to whether a user event has occurred (step 680). If so, a corresponding JavaScript handler is utilized to convert the event to an action by the JavaScript objects (step 690). The operation then terminates. This process may be performed with each JSP Web page requested by the client device, with each refresh of a JSP Web page, or the like.

Figure 7:
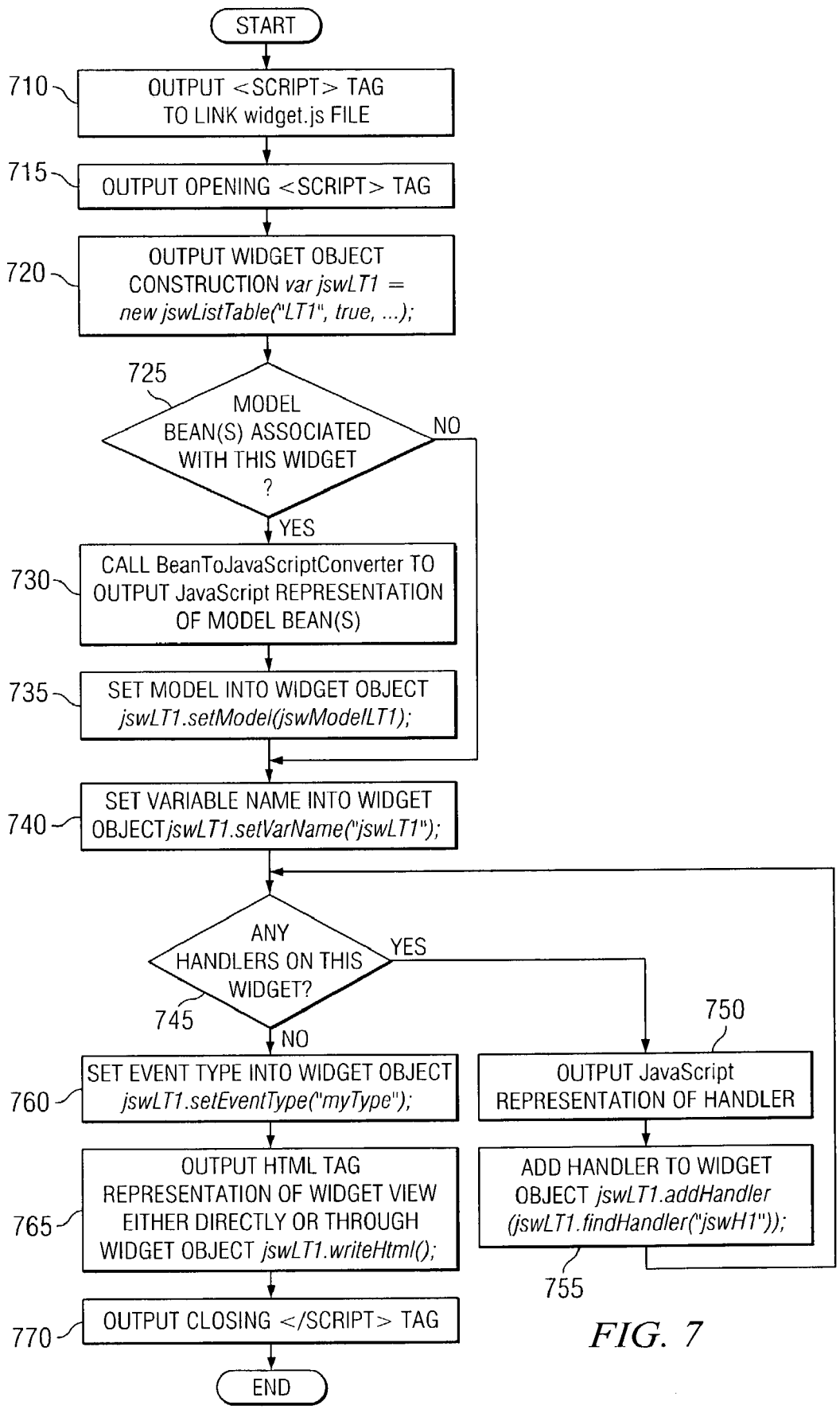
FIG. 7 is a flowchart outlining an exemplary operation of the present invention when generating objects based on custom JSP tags.

FIG. 7 is a flowchart outlining an exemplary operation of the present invention when generating objects based on custom JSP tags. As shown in FIG. 7, the operation starts with outputting directly to the response stream a JavaScript script tag to link the widget JavaScript file, e.g., a ".js" file, containing the JavaScript class definition of the widget (step 710). An opening JavaScript tag is then output directly to the response stream sent to the client device (step 715). The operation then outputs a widget JavaScript object construction, e.g. varjswLT1=new jswListTable("LT1",true, . . . ) (step 720), using the constructor as defined in the class definition. A constructor is part of the class definition and is a template for creating new object instances.

Figure 8A:
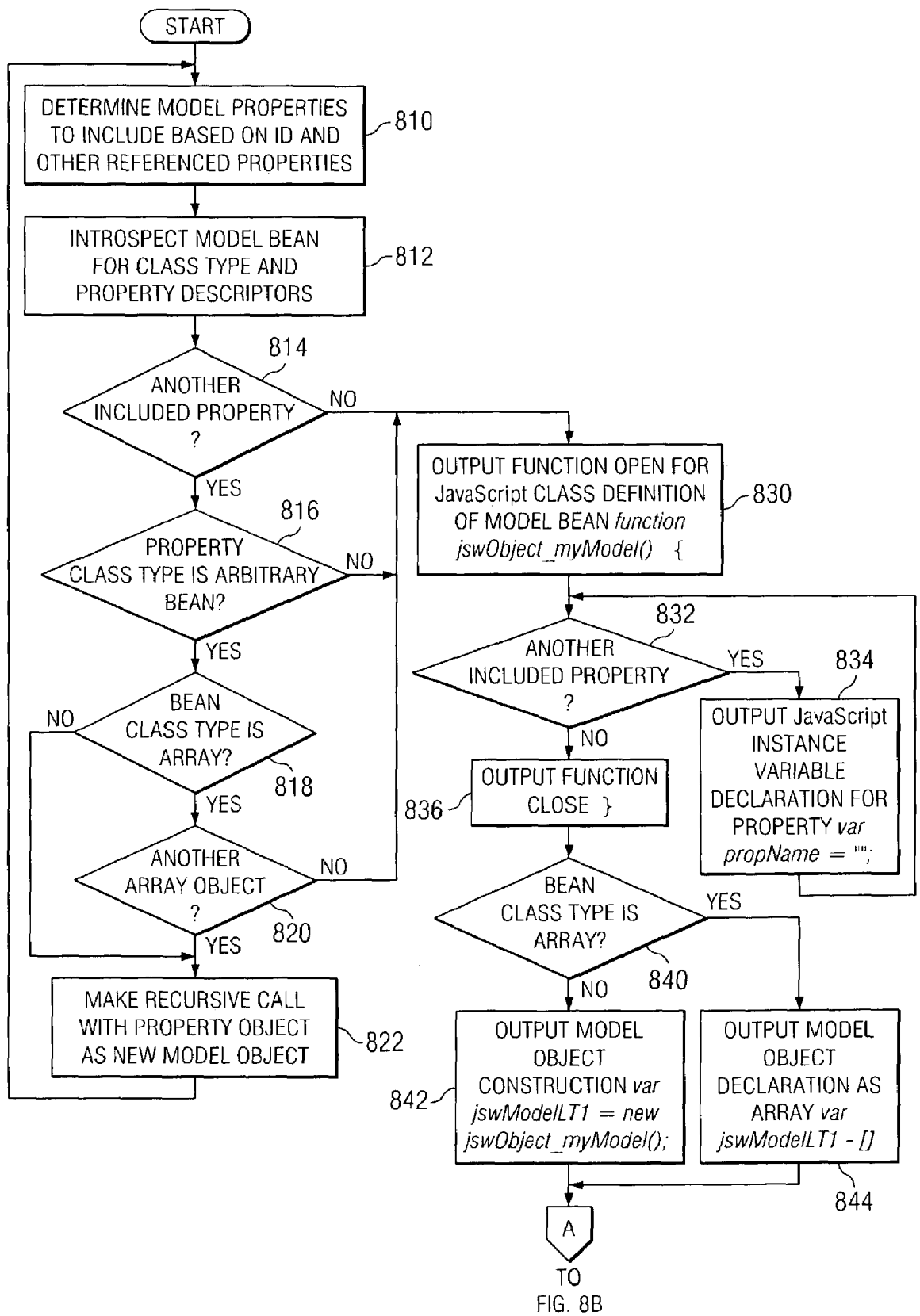
FIGS. 8A and 8B are flowcharts outlining an exemplary operation of the present invention for outputting JavaScript representations of model Java Beans.
Figure 8B:
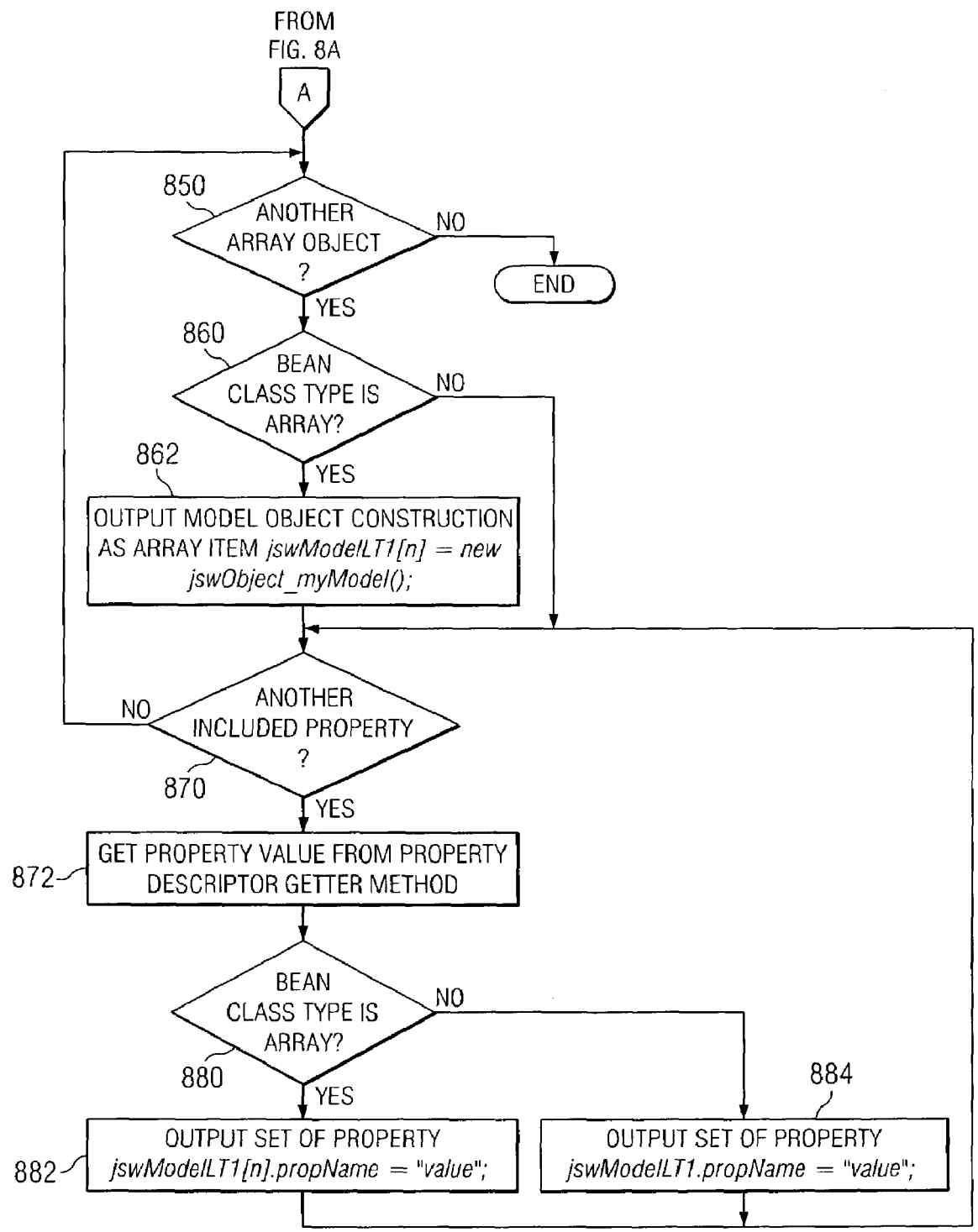

A determination is then made as to whether there are any server-side model JavaBeans associated with this widget as passed to the tag object through the custom JSP tag attributes (step 725). If so, a JavaBean to JavaScript converter method, the operation of which is illustrated in FIGS. 8A and 8B hereafter, is called to output a JavaScript representation of the JavaBean (step 730). The client-side model representation is then set into the widget object (step 735), e.g., jswLT1.setModel(jswModelLT1).

Thereafter, or if there are no JavaBeans associated with the widget, the variable name is then set into the widget object, e.g., jswLT1.setVarName("jswLT1") (step 740). This variable name is used internally to achieve widget addressability.

A determination is then made as to whether there are any handlers associated with this widget as specified as custom JSP tags on the JSP Web page and associated together via the tag "id" and "handler" attributes (step 745). If there are handlers associated with this widget, then a JavaScript representation of the handler is output (step 750) by constructing a handler JavaScript object using the handler constructor as defined in the handler class definition file that is also implicitly linked as necessary in the first step (step 710). The handler is then added to the widget object (step 755), e.g., jswLT1.addHandler(jswLT1. findHandler ("jswH1")). The operation then returns to step 745. If there are no more handlers associated with this widget (step 745), the event type is set into the widget object (step 760), e.g., jswLT1.setEventType("myType"). The event type is acquired from the widget user through the optional "eventType" tag attribute, and provides for a way to optionally filter certain events by type. So, instead of a handler responding to all "on ButtonClick" events, for example, as would be the default if no event types are utilized, the user can type a widget such as a toolbar button with any type of their choosing, such as "delete", and then tell a handler to only respond to "onButtonClick" events from the "delete" toolbar button only.

Thereafter, an HTML tag representation of the view of the widget is output either directly to the response stream from the tag object or through the widget object (step 765), e.g., using the method jswLT1.writeHtml( ) in the widget object. A closing JavaScript tag is then output (step 770) and the operation ends.

FIGS. 8A and 8B are flowcharts outlining an exemplary operation of the present invention for outputting JavaScript representations of model Java Beans. As shown in FIGS. 8A and 8B, the operation starts by determining model properties to include in the JavaScript representation of the JavaBean based on the identifier of the JavaBean and other reference properties (step 810). These reference properties are determined by tag attribute and child tag usage and used for performance to ensure only needed properties are converted to the client. For example, a list table widget, which is a list box with multiple columns, might have three child column tags specified, each with a "property" attribute specified. The JavaBean might have twenty properties, and, as critical for performance, the invention only converts the three that are needed. Introspection is performed on the JavaBean to identify the class type and property descriptors (step 812). A determination is then made as to whether another property is to be included (step 814). If so, a determination is made as to whether the property type is an arbitrary JavaBean (a sufficiently complex object as opposed to a primitive, such as an integer, or one of a few well know simple objects such as String or Date) (step 816). If the property type is an arbitrary JavaBean, a determination is made as to whether the JavaBean class type is an array (step 818). If so, a determination is made as to whether there is another array object (step 820). If there is another array object, then a recursive call is made with the property object as a new model object (step 822). The operation then returns to step 810.

If there is no other property (step 814), the class type is not an arbitrary JavaBean (step 816), or there are no other array objects (step 820), a function open is output for a JavaScript class definition of the JavaBean (step 830), e.g., function jswObject_myModel( ). A determination is then made as to whether another property is to be included (step 832). If so, a JavaScript instance variable declaration for the property is output (step 834), e.g., var propName=" ", and the operation returns to step 832. If another property is not included, a function close is output (step 836).

A determination is then made as to whether the JavaBean class type is an array (step 840). If not, a model object construction is output (step 842), e.g., var jswModelLT1= new jswobject_myModel( ). If the JavaBean class type is an array, a model object declaration as an array is output (step 844), e.g., var jswModelLT1=[ ]. The operation then determines if there is another array object (step 850). If not, the operation ends. Otherwise, a determination is made as to whether the JavaBean class type is an array (step 860). If so, a model object construction as an array item is output (step 862), e.g., jswModelLT1[n]= new jswObject_myModel( ).

Thereafter, or if the JavaBean class type is not an array, a determination is made as to whether another property is to be included (step 870). If not, the operation returns to step 850. If another property is to be included, the property value is obtained from the property descriptor getter method (step 872). A determination is then made as to whether the JavaBean class type is an array (step 880). If so, the property is set as an array object (step 882), e.g., jswModelLT1[n] .propName="value". If the JavaBean class type is not an array, then the property is set as a non-array object (step 884), e.g., jswModelLT1 .propName="value". The operation then returns to step 870.

Thus, the present invention provides a mechanism for automatically generating JavaScript objects for a JSP Web page and transmitting the JSP Web page to a client device as a combination of JavaScript objects, JavaScript representing handlers associated with the JavaScript objects, and HTML defining a view of the JSP Web page and the widgets defined by the JavaScript objects. For the first time, complete object representations of the view, model, and handlers reside on the client and work together to achieve high-level functionality without going back to the server. In this way, high-level functionality is achieved through the combined use of the JavaScript handlers and JavaScript objects.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of providing browser widgets in a data processing system, comprising:
    receiving a request, from a client device, for a web page having a custom tag for a browser widget;
    generating a browser widget object for the browser widget based on the custom tag;
    generating code for representing a view of the web page; and
    transmitting the browser widget object and the code for representing the view of the web page to the client device, wherein the browser widget object provides a client-side model for providing browser widget functionality, wherein the method further comprises:
    determining if a browser widget handler is associated with the browser window object; and
    generating a code representation of a client-side handler and transmitting the code representation of the client-side handler to the client device if a browser widget handler is associated with the browser window.

2. The method of claim 1, wherein generating the browser widget object includes:
    generating a script block that links a class definition file for the browser widget and a construction script block that constructs the browser widget object using the class definition; and
    setting a variable name of the construction script block in the browser widget object.

3. The method of claim 2, wherein generating the browser widget object further includes:
    determining whether there is a JavaBean from a server-side model referenced in attributes of the custom tag; and
    converting the JavaBean to a JavaScript representation of the JavaBean and encapsulating the JavaScript representation in the browser widget object, if the attributes reference a JavaBean from a server-side model.

4. The method of claim 1, wherein determining if a browser widget handler is associated with the browser window object comprises:
    determining if there is a browser widget handler identified in the web page; and wherein generating a code representation of a client-side handler and transmitting the code representation of the client-side handler to the client device if a browser widget handler is associated with the browser window comprises:
    constructing a handler tag object which outputs a script block linking a handler class definition file and a constructor script block that constructs the browser widget handler object using the class definition and registers the handler with the browser widget object, if there is a browser widget handler identified in the web page.

5. The method of claim 4, further comprising:
setting an event type in the browser widget object, wherein the event type indicates a type of event that causes the browser widget handler object to be invoked.

6. The method of claim 1, wherein the code for representing a view of the web page is HyperText Markup Language (HTML) code.

7. The method of claim 1, wherein the browser widget object is generated based on one or more of an object and a JavaBean in a server-side model.

8. The method of claim 1, further comprising:
converting the custom tag to a tag object, wherein the tag object performs the step of generating the browser widget object for the browser widget.

9. The method of claim 1, wherein the browser widget is one of drop-down menu, a dialog window, and a virtual push button.

10. A computer program product in a computer readable medium for providing browser widgets in a data processing system, comprising:
first instructions for receiving a request, from a client device, for a web page having a custom tag for a browser widget;
second instructions for generating a browser widget object for the browser widget based on the custom tag;
third instructions for generating code for representing a view of the web page; and
fourth instructions for transmitting the browser widget object and the code for representing the view of the web page to the client device, wherein the browser widget object provides a client-side model for providing browser widget functionality, wherein the computer program product further comprises:
fifth instructions for determining if a browser widget handler is associated with the browser window object; and
sixth instructions for generating a code representation of a client-side handler and transmitting the code representation of the client-side handler to the client device if a browser widget handler is associated with the browser window.

11. The computer program product of claim 10, wherein the second instructions for generating the browser widget object include:
instructions for generating a script block that links a class definition file for the browser widget and a construction script block that constructs the browser widget object using the class definition; and
instructions for setting a variable name of the construction script block in the browser widget object.

12. The computer program product of claim 11, wherein the second instructions for generating the browser widget object further include:
instructions for determining whether there is a JavaBean from a server-side model referenced in attributes of the custom tag; and
instructions for converting the JavaBean to a JavaScript representation of the JavaBean and encapsulating the JavaScript representation in the browser widget object, if the attributes reference a JavaBean from a server-side model.

13. The computer program product of claim 10, wherein the fifth instructions for determining if a browser widget handler is associated with the browser window object comprises:
instructions for determining if there is a browser widget handler identified in the web page; and wherein the sixth instructions for generating a code representation of a client-side handler and transniitting the code representation of the client-side handler to the client device if a browser widget handler is associated with the browser window, comprises:
instructions for constructing a handler tag object which outputs a script block linking a handler class definition file and a constructor script block that constructs the browser widget handler object using the class definition and registers the handler with the browser widget object, if there is a browser widget handler identified in the web page.

14. The computer program product of claim 13, further comprising:
seventh instructions for setting an event type in the browser widget object, wherein the event type indicates a type of event that causes the browser widget handler object to be invoked.

15. The computer program product of claim 10, wherein the code for representing a view of the web page is HyperText Markup Language (HTML) code.

16. The computer program product of claim 10, wherein the browser widget object is generated based on one or more of an object and a JavaBean in a server-side model.

17. The computer program product of claim 10, further comprising:
seventh instructions for converting the custom tag to a tag object, wherein the tag object performs the step of generating the browser widget object for the browser widget.

18. An apparatus for providing browser widgets in a data processing system, comprising:
means for receiving a request, from a client device, for a web page having a custom tag for a browser widget;
means for generating a browser widget object for the browser widget based on the custom tag;
means for generating code for representing a view of the web page; and
means for transmitting the browser widget object and the code for representing the view of the web page to the client device, wherein the browser widget object provides a client-side model for providing browser widget functionality, wherein the apparatus further comprises:
means for determining if a browser widget handler is associated with the browser window object; and
means for generating a code representation of a client-side handler and transmitting the code representation of the client-side handler to the client device if a browser widget handler is associated with the browser window.

* * * * *